United States Patent
Amico et al.

(10) Patent No.: US 7,706,578 B2
(45) Date of Patent: Apr. 27, 2010

(54) IMAGE COMPILATION PRODUCTION SYSTEM AND METHOD

(75) Inventors: Mark Steven Amico, Pittsford, NY (US); Michael John Martin, Hamlin, NY (US)

(73) Assignee: Xerox Corporation, Norwalk, CT (US)

( * ) Notice: Subject to any disclaimer, the term of this patent is extended or adjusted under 35 U.S.C. 154(b) by 982 days.

(21) Appl. No.: 11/455,601

(22) Filed: Jun. 19, 2006

(65) Prior Publication Data

US 2007/0291119 A1 Dec. 20, 2007

(51) Int. Cl.
*G06K 9/00* (2006.01)
*G03B 17/00* (2006.01)

(52) U.S. Cl. ............... 382/118; 382/100; 382/103; 396/56

(58) Field of Classification Search ............ 382/115
See application file for complete search history.

(56) References Cited

U.S. PATENT DOCUMENTS

| 2004/0004663 | A1 | 1/2004 | Kahn et al. | 348/207.1 |
| 2004/0008872 | A1* | 1/2004 | Goldberg | 382/115 |
| 2006/0056832 | A1* | 3/2006 | Yamaguchi et al. | 396/56 |
| 2006/0078201 | A1 | 4/2006 | Kim et al. | 382/181 |

OTHER PUBLICATIONS

European Search Report, EP 07 11 0365, dated Sep. 26, 2007.

\* cited by examiner

*Primary Examiner*—Charles Kim
*Assistant Examiner*—Thomas A Conway
(74) *Attorney, Agent, or Firm*—Alix, Yale & Ristas, LLP

(57) ABSTRACT

An image compilation production system and method, for use in a setting attended by multiple visitors. The system comprises multiple identification devices, multiple digital image capturing devices, and a reader device associated with each of the image capturing devices. Each identification device includes an electronic data storage device having identification data stored therein. One of the identification devices is carried by at least one of the visitors to the setting. The reader device activates the digital image capturing device to capture the image of the visitor when the identification data stored in the electronic data storage device of the identification device is carried within the detection range of the associated reader device by the visitor.

18 Claims, 7 Drawing Sheets

| CUSTOMER | PURCH. | NO. IN PARTY | MEMBER 1 ID | MEMBER 1 NAME | MEMBER 2 ID | MEMBER 2 NAME | MEMBER 3 ID | MEMBER 3 NAME | MEMBER 4 ID | MEMBER 4 NAME |
|---|---|---|---|---|---|---|---|---|---|---|
| Smith 34 | delux | 3 | xxxx1 20' | Tom | xxxx2 20' | Mary | xxxx3 | Junior | | |
| | | | | | | | | | | |
| | | | | | | | | | | |
| | | | | | | | | | | |

| PHOTO 1 ID | MEMBERS IN PHOTO 1 | PHOTO 2 ID | MEMBERS IN PHOTO 2 | PHOTO 3 ID | MEMBERS IN PHOTO 3 | PHOTO 4 ID | MEMBERS IN PHOTO 4 | PHOTO 5 ID | MEMBERS IN PHOTO 5 |
|---|---|---|---|---|---|---|---|---|---|
| A00021 38 36 | xxxx1 xxxx2 20' | X00100 | xxxx1 xxxx2 xxxx3 | C0004 | xxxx3 | | | | |
| | | | | | | | | | |
| | | | | | | | | | |
| | | | | | | | | | |

IMAGE COMPILATION PRODUCTION SYSTEM AND METHOD

BACKGROUND

This disclosure relates generally to apparatus and methods for organizing electronic and/or hard copy images. More particularly, the present disclosure relates to apparatus and methods for organizing images in a custom/personalized image collection.

Families visiting amusement parks, theme parks and the like often take many photographs of the family members enjoying the attractions. Many such parks have image-capturing devices positioned at roller coasters, water rides, or the like, to take electronic images of the riders. Cruise ships employ photographers to photograph vacationers at various functions organized by the ship. Hard copy photographs of the ride electronic images and cruise photographs may be purchased, providing a means of obtaining photographs that would otherwise be unobtainable.

Some time period after the visit/vacation has occurred, the photographs are developed and/or printed. Such photographs are generally mounted in a conventional photo album, or simply stored in no organized manner with numerous photographs taken at earlier dates. Most conventional photo albums merely hold the photographs in an organized manner. If the vacationer wishes to include information such as the identity of the persons shown in the photographs, the photographs must be mounted in a scrapbook and the additional information added to the page in a legible manner. While such "scrap booking" is a hobby for many people, the majority of vacationers have neither the inclination or skills to produce an album that includes anything more than photographs and the names of the persons in the photographs.

SUMMARY

There is provided an image compilation production system for use in a setting attended by multiple visitors. The image compilation production system comprises multiple identification devices, multiple digital image capturing devices, and a reader device associated with each of the image capturing devices. Each identification device includes an electronic data storage device having identification data stored therein. Each reader device has a detection range for sensing the identification data stored in the electronic data storage device. One of the identification devices is carried by at least one of the visitors to the setting. The reader device activates the digital image capturing device to capture the image of the visitor when the identification data stored in the electronic data storage device of the identification device is carried within the detection range of the associated reader device by the visitor.

Each of the digital image capturing devices is mounted in a fixed location.

At least one of the digital image capturing devices is a scene image capturing device positioned to capture the image of a predetermined view within the setting. At least one of the digital image capturing devices is a portrait image capturing device positioned to capture the image of a person standing in, sitting in, or moving through a predetermined location within the setting.

The image compilation production system may further comprise a system computer in communication with each image capturing device and each reader device. The computer includes a memory having a database stored therein, the database including a customer record associated with each image compilation.

The customer record includes a customer identification and the identification data stored in the electronic data storage device of each identification device carried by each visitor associated with the image compilation. The customer record also includes identification data for each image associated with the image compilation that is captured by one of the image capturing devices and the identification data sensed by the reader device associated with the image capturing device.

The image compilation production system may further comprise at least one user interface in communication with the system computer and at least one production device, for example a printing device, a binding device, or a media burner.

There is also provided a method of producing a compilation of images captured in a setting attended by multiple visitors. The method includes issuing an identification device to at least one visitor, the identification device including an electronic data storage device having identification data stored therein. One of multiple digital image capturing devices located in the setting is activated to capture the image of the visitor when the identification data stored in the electronic data storage device carried by the visitor is sensed by an associated reader device. The captured image of the visitor is saved as a digital image. These digital images are later compiled when purchased by the visitor.

Issuing an identification device comprises creating a customer record in a database stored in a computer. The customer is identified by determining whether the visitor is alone or part of a larger group and providing the identification device to the visitor if the visitor is alone, or identifying other members of the group and providing one of the identification devices to each member of the group. Issuing an identification device further comprises storing the identification data of the identification device provided to the single visitor in a field of the customer record or storing the identification data of each identification device provided to the members of the group of visitors in a field of the customer record.

Activating one of the digital image capturing devices comprises reading the identification data stored in all electronic data storage devices passing within sensing range of each reader device. Then it is determined whether the identification data is associated with any customer records in the database. The digital image capturing device associated with the reader device reading the identification data is activated to capture the image of the visitor if the identification data is associated with a customer record.

Activating one of the digital image capturing devices further comprises associating identification data for the electronic image with the identification data for the visitor actuating the image capturing device and storing the identification data for the electronic image and the identification data for the visitor in the associated customer record. Before the digital image capturing device is activated, the database may be queried to determine whether the customer record already includes an electronic image of the visitor that has been captured by the image capturing device. In this case, the digital image capturing device would be activated if the database does not an electronic image of the visitor that has been captured by the image capturing device.

Compiling the digital images of the visitor comprises identifying the customer record for the visitor, verifying that payment has been received for the image compilation. If payment has been receive, the electronic images for the visitor are extracted from the database and the image compilation is produced by a production device from the extracted electronic images.

Before the image compilation is produced, stock text is matched with at least one of the electronic images based upon the image capturing device identification data and the visitor identification data. The image compilation is produced with the stock text disposed proximate to the associated electronic image.

Alternatively, compiling the digital images of the visitor may comprise determining whether the visitor wishes to review the digital images associated with the customer record, determining whether the visitor wishes to review options provided by the image compilation production system, computing a cost of for the image compilation, and displaying the computed cost to the visitor. Upon verification that payment has been received for the image compilation, the selected electronic images are extracted from the database, the selected options are implemented, and the image compilation is produced with a production device. Upon verification that payment has not been received for the image compilation, the system waits for visitor input.

Determining whether the visitor wishes to review the digital images associated with the customer record comprises querying the visitor if it wishes to review the electronic images associated with the customer record. If the visitor chooses to review the electronic images, the electronic images are displayed. The system queries whether the visitor wishes to save the selected electronic images and saves the selected electronic images if the visitor so chooses. If the visitor chooses not to save the selected electronic images, the system waits for visitor input.

Determining whether the visitor wishes to review the options provided by the image compilation system comprises querying the visitor if it wishes to review the options provided by the image compilation production system. If the visitor chooses to review the provided by the image compilation production system, the options are displayed. The system queries whether the visitor wishes to save the selected options and saves the selected options if the visitor so chooses. If the visitor chooses not to save the selected options, the system waits for visitor input.

BRIEF DESCRIPTION OF THE DRAWINGS the present disclosure may be better understood and its numerous objects and advantages will become apparent to those skilled in the art by reference to the accompanying drawings in which:

FIG. 3 is a schematic representation of a database stored in the computer of FIG. 1;

DETAILED DESCRIPTION

Figure 1:
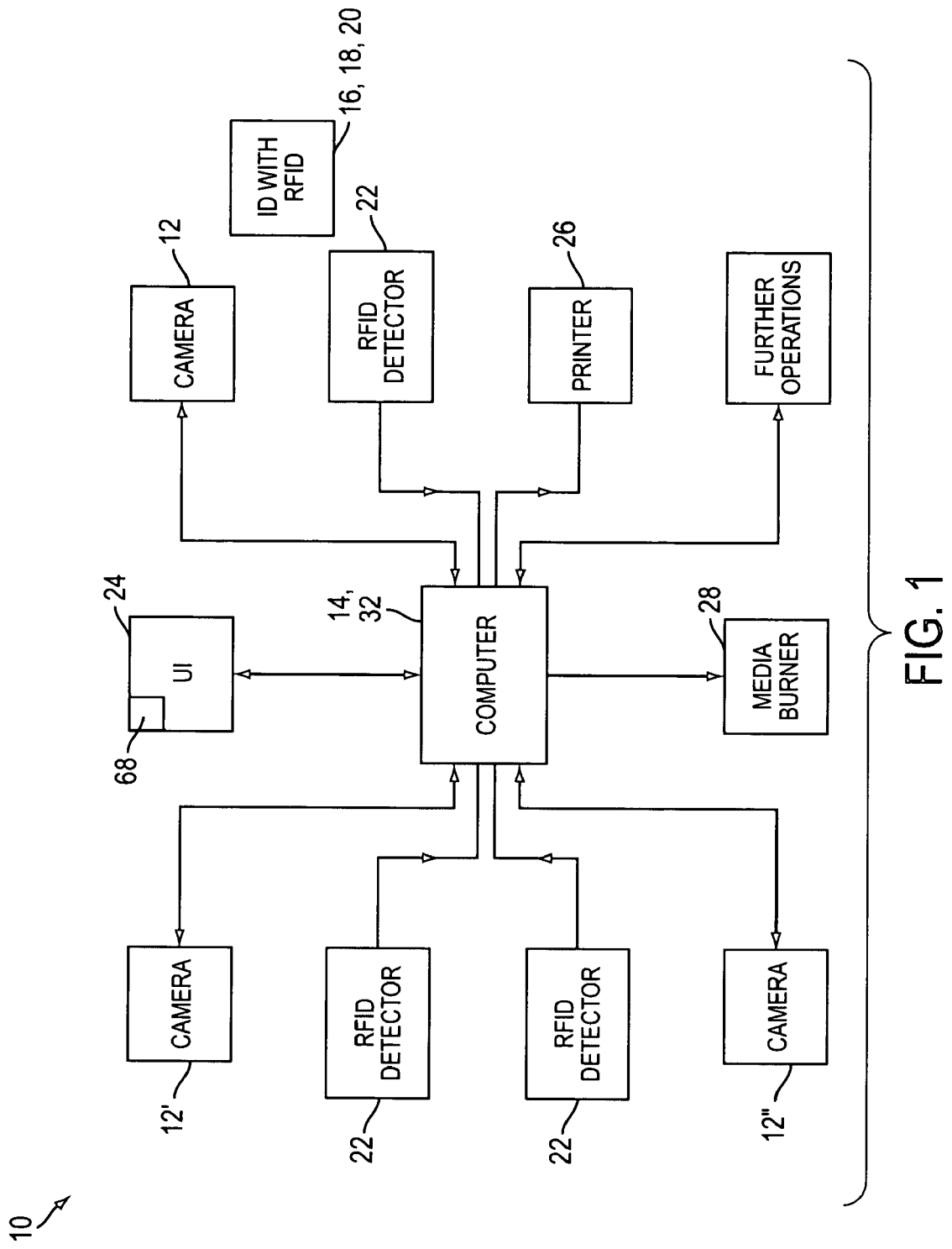
FIG. 1 is a schematic diagram of an image compilation production system in accordance with the disclosure.

With reference to the drawings wherein like numerals represent like parts throughout the several figures, an image compilation production system in accordance with the present disclosure is generally designated by the numeral 10. The image compilation production system 10 may be installed in any setting where visitors are likely to take photographs of the setting or have photographs taken of themselves. A "setting" is hereby defined to be any location, geographical area, or bounded space, during any time period, and/or any space or time boundary as defined by a user. Examples of such settings include, but are not limited to, amusement parks, theme parks, water parks, zoos and cruise ships. The image compilation production system 10 produces an image compilation, containing photos and text. The image compilation provides a unique record specific to each customer, reflecting the specific sights and/or events that were enjoyed by the customer. The image compilation production system 10 produces an image compilation "package", which may include a hard-copy image compilation and/or digital media having copies of electronic images, text, animation, movie clips, or the like.

The image compilation production system 10 includes multiple digital image capturing devices 12 that are each mounted in a fixed location. Each of the image capturing devices 12 is generally connected to a system computer 14. Some of the image capturing devices 12' ("scene" image capturing devices) may be positioned to capture the image of popular views within the setting. Similar to conventional roller coaster and water ride image capturing devices, other image capturing devices 12" are positioned to capture the image of a person standing in, sitting in, or moving through a set location within the setting. Optimally, the "portrait" image capturing devices 12" capturing the image of the people will be positioned such that one of the popular views will appear in the background. Each visitor entering the setting may be issued an identification device (ID) 16 having an electronic data storage device (EDSD) 18 with identification data 20 stored therein. Alternatively, only those visitors having purchased an image compilation package may be issued an ID 16 having an electronic data storage device (EDSD) 18 with identification data 20 stored therein. A reader device 22 capable of sensing the identification data 20 stored in the electronic data storage device 18, for example an RFID reader, is associated with each image capturing device 12, 12', 12" of the image compilation production system 10. If a portrait image capturing device 12" is in close proximity to a scene image capturing device 12', a single reader device 22 may be associated with the two image capturing devices 12', 12".

Each reader device 22 is generally connected to the system computer 14. If necessary, a reader device 22 may be connected to the associated image capturing device 12. If the image capturing device is a portrait image capturing device 12", the reader device 22 is generally positioned such that the visitor carrying the ID 16 is within range of the portrait image capturing device 12" when their ID 16 is sensed by the reader device 22. Accordingly, the portrait image capturing device 12" is actuated by the computer 14 or the reader device 22 to capture the image of the visitor when the visitor passes within range of the portrait image capturing device 12". Similarly, scene image capturing devices 12' are actuated by the computer 14 or the associated reader device 22 to capture the image of a view when the visitor passes by the point of view.

At least one user interface (UI) 24 is connected to the system computer. Generally, any location selling the image compilation package will include a user interface 24 to initiate creation of the database record when an image compilation package is sold to the family/customer. Special purpose kiosks or the like may be utilized, where the family/customer may go to review their electronic images and/or retrieve the completed image compilation. Such kiosks may include one or more user interfaces 24 for use in customizing the image compilation, if this option is available. The setting will generally have a principal location housing the computer 14 and network apparatus to which the remote image capturing devices 12 and reader devices 22 are connected. Print shop equipment necessary for producing hard copy image compilations, including printing devices 26, binding equipment, etc., and media burners 28, such as CD or DVD burners, may be located in at the principal location or at a remote location.

Each ID 16 issued at the setting has an electronic data storage device 18. An "electronic data storage device" is a machine-writeable and machine-readable device capable of storing electronic data. Electronic data storage device refers to a single electronic data storage device as well as to a collection of two or more electronic data storage devices connected, for example, in series, in parallel, or nested one within another. Examples of electronic data storage devices include, but are not limited to, radio frequency identification tags (RFID tags), proximity (Prox) tags, iButtons, smartcards, and similar devices. Radio frequency identification (RFID) is a method of remotely storing and retrieving data using devices called RFID tags/transponders. An RFID tag is a small object, such as an adhesive sticker, that can be attached to or incorporated into a product. RFID tags contain antennas to enable them to receive and respond to radio-frequency queries from an RFID transceiver.

A customer record 30 is created in a database 32 stored in the system computer 14 for each customer. Each customer record 30 includes a field containing a unique customer identification 34. A "customer" is hereby defined to be any single visitor to the setting or any group of visitors, as defined by a user, that has an interest in an image compilation having images of all of the members of the group. One example of customer comprising a group of visitors is a family. It should be appreciated that any single visitor may be identified with more than one customer. For example, a bride and groom may identify all attendees at their wedding as members of one customer group while individuals or families attending the wedding may identify themselves as another customer or customer group, respectively.

Figure 6:
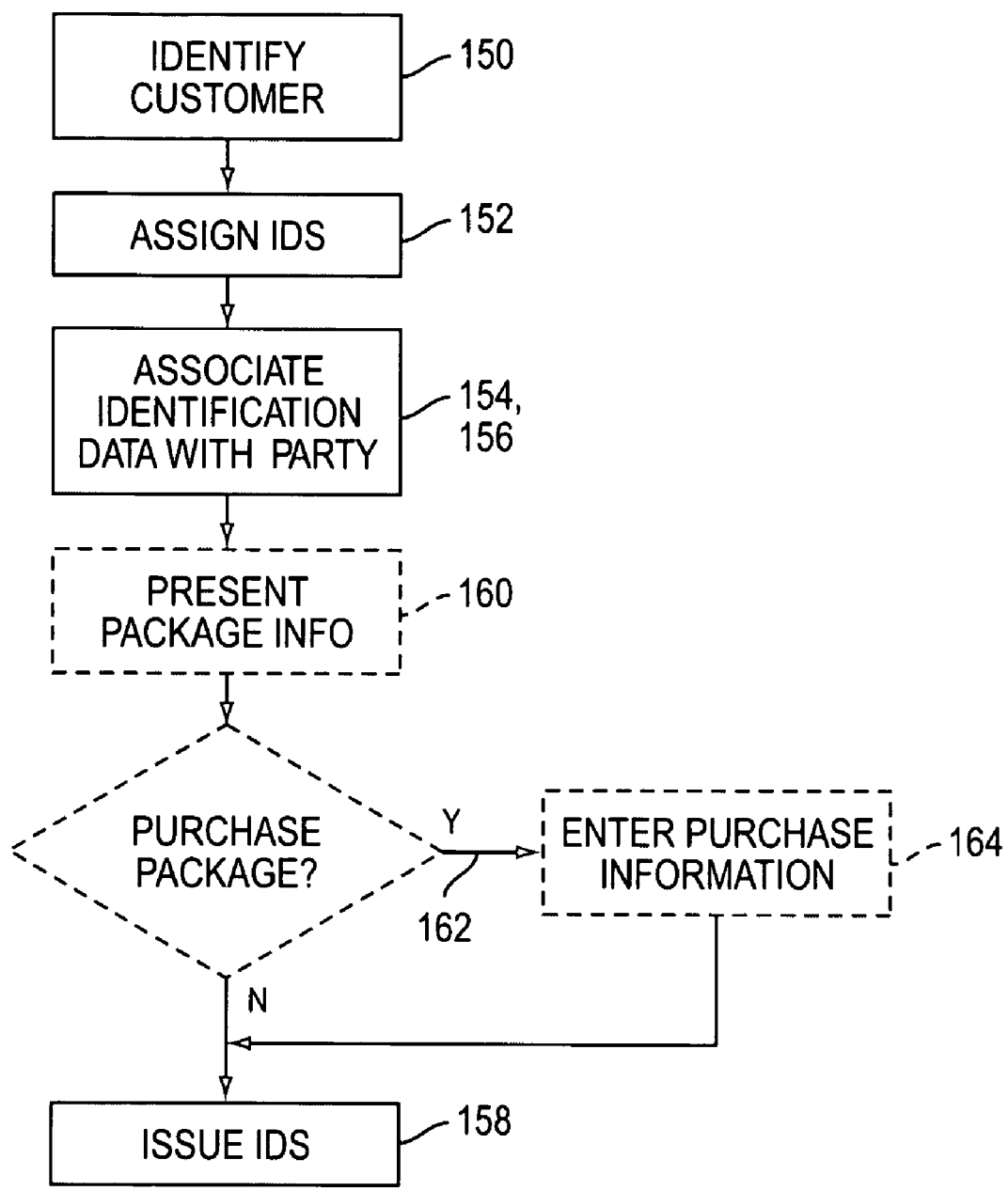
FIG. 6 is a flow diagram of a customer record initiation routine in accordance with the disclosure.

Since a customer may be a single visitor or a group of visitors, creation of the customer record 30 requires that the nature of the customer be identified 150 (FIG. 6). More specifically, the person issuing the IDs 16 determines whether each visitor is alone or part of a larger group. If the customer is a single visitor, the person issuing the ID assigns 152 the ID 16 to the visitor and stores 154 the identification data stored in the electronic data storage device 18 of the IDs 16 in the customer record 30, thereby associating 156 the visitor with the customer identification 34. The IDs 16 are then issued 158 to the visitor. If the visitor is part of a group of visitors, the person identifies 150 the other members of the party, assigns 152 an ID 16 to each member of the party, and stores 154 the identification data stored in the electronic data storage device 18 of each of the assigned IDs 16 in the customer record 30, thereby associating 156 each party member with the customer identification 34. Each ID 16 is then issued 158 to the assigned appropriate party member. Each ID 16 may include a picture or the name of the assigned party member to reduce the chance of visitors accidentally swapping IDs 16.

The person issuing the IDs 16 may also present 160 the customer with information regarding the image compilation packages that are available for purchase. If the customer purchases 162 an image compilation package, purchase information is entered 164 into the customer record 30. It should be appreciated that the process of selling an image compilation package will be performed first, if IDs 16 are issued only to visitors who purchase such a package.

When a visitor triggers a image capturing device 12, identification data 36 for the electronic image is entered into a field of the customer record 30, and the identification data 20 for the visitor(s) that actuated the image capturing device 12 is entered into a corresponding field. The electronic image identification data 36 may include image capturing device identification data 38, or the database may include separate fields for image capturing device identification data.

Figure 2:
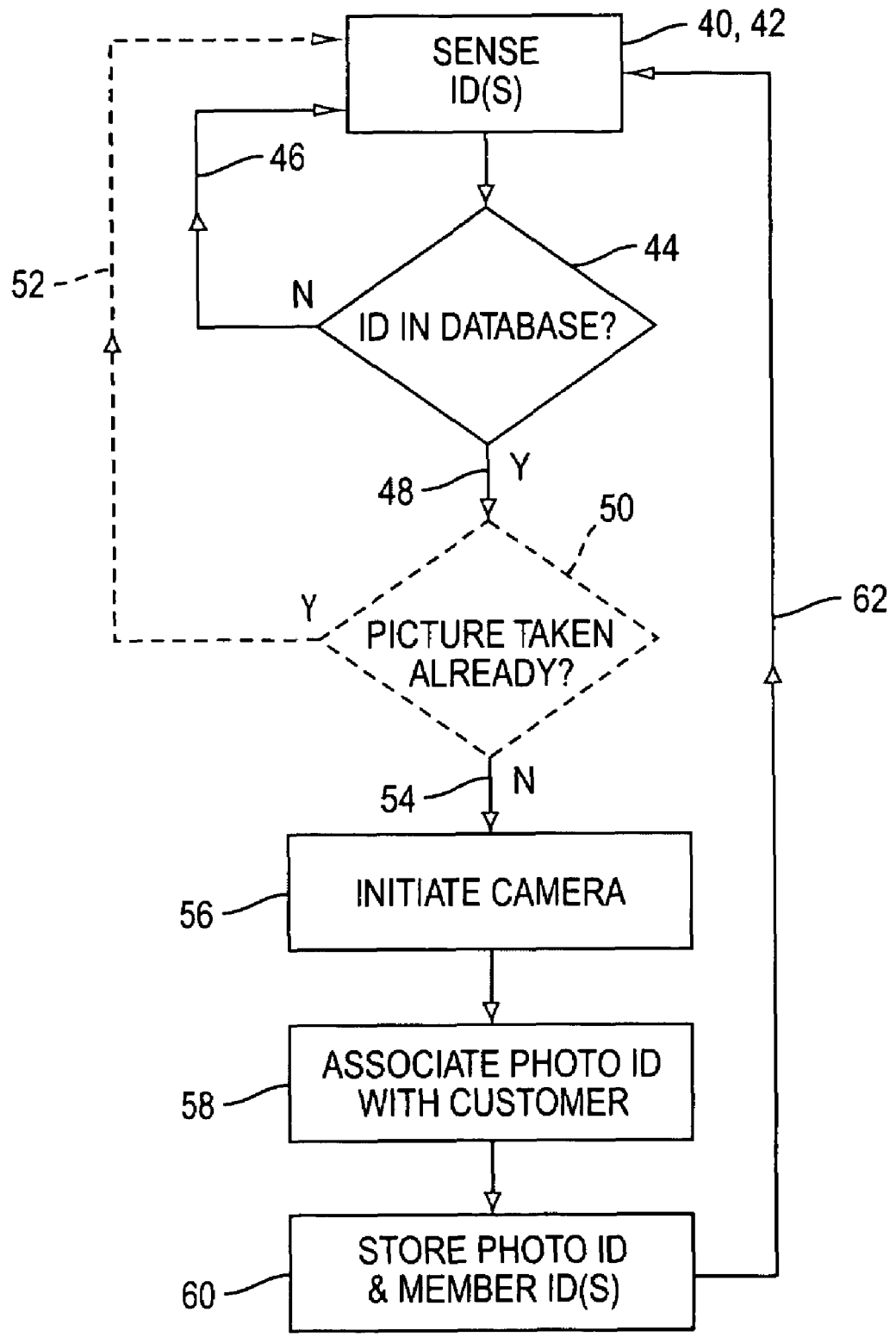
FIG. 2 is flow diagram of a photograph initiation routine in accordance with the disclosure.

As mentioned above, the image capturing devices 12 are actuated when a visitor passes within range of the image capturing device 12. More specifically, each reader device 22 remains in standby until it senses an electronic data storage device 18 (FIG. 2). On sensing 40 such a device 18, the reader device 22 reads 42 the identification data 20 stored in the EDSD 18 and determines 44 whether the identification data 20 is associated with any of the active customer records 30 in the database 32. Electronic data storage devices are becoming quite common in use and digital electronic image files can be quite large. Accordingly, if the identification information 20 retrieved from the sensed electronic data storage device 18 cannot be found 46 in the database 32, the reader device 22 returns to standby and the image capturing device 12 is not actuated. If the identification information 20 retrieved from the sensed electronic data storage device 18 is found 48 in an active customer record 30 of the database 32, one of two different courses of action will be initiated depending on the capabilities of the image compilation production system 10 installed at the setting and on the characteristics of the image compilation package that has been purchased by the customer/family.

If the image compilation production system 10 installed at the setting does not provide for customization of the image compilations, or if the customer/family has purchased a basic image compilation package, it is unlikely that such an image compilation would include more than one of any single visitor at any particular location in the setting. Accordingly, the computer 14 may query 50 the database 32 to determine whether the customer record already includes a electronic image of the visitor sensed by the reader device 22 at the location captured by the image capturing device 12 associated with the reader device 22. If the database 32 already includes 52 such a electronic image, the reader device 22 returns to standby and the image capturing device 12 is not actuated. If the database 32 does not already include 54 such a electronic image, the computer 14 initiates 56 the image capturing device(s) 12 associated with the reader device 22, associates 58 identification data 36 for the electronic image(s) taken by the image capturing device(s) 12 with the identification data 20 for the visitor(s) actuating the image capturing device 12, and stores 60 the identification data 36 for the electronic image(s) and the identification data 20' for the visitor(s) in the appropriate customer record 30. The reader device 22 then returns 62 to standby.

If the image compilation production system 10 installed at the setting provides for customization of the image compilations, and the customer/family has purchased a custom image compilation package, the computer 14 may not query the database 32 to determine whether the customer record already includes a electronic image of the visitor sensed by the reader device 22 at the location captured by the image capturing device 12 associated with the reader device 22. In this case, the computer 14 initiates 56 the image capturing device(s) 12 associated with the reader device 22, associates 58 identification data 36 for the electronic image(s) taken by the image capturing device(s) 12 with the identification data 20 for the visitor(s) actuating the image capturing device 12, and stores 60 the identification data 36 for the electronic image(s) and the identification data 20' for the visitor(s) in the appropriate customer record 30. The reader device 22 then returns 62 to standby. The customer/family may select which or the electronic images taken at the location are included in the image compilation, as described below.

Figure 5:
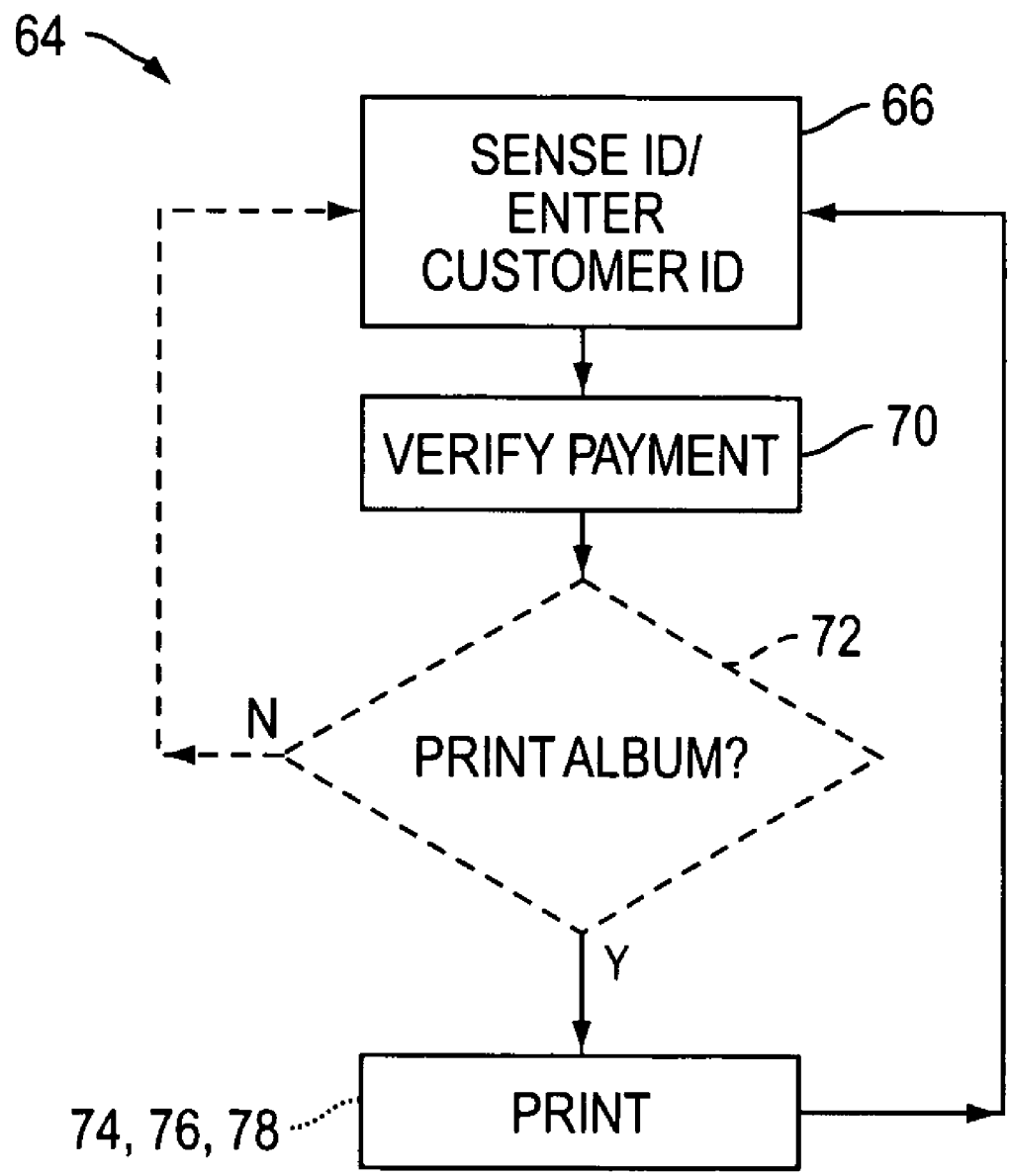
FIG. 5 is a flow diagram of a second embodiment of a image compilation generation routine in accordance with the disclosure.

With reference to FIG. 5, in the case described above, where the image compilation production system 10 installed at the setting does not provide for customization of the image compilations, or the customer/family has purchased a basic image compilation package, producing/generating the image compilation 64 is a relatively simple operation. First, the customer record 30 for the image compilation package purchased by the customer/family is identified by entering 66 the customer identification 34 into the system computer 14 via a user interface 24. This is most easily accomplished by collecting the ID(s) 16 that had been issued to the visitors and sensing the identification data 20 stored in the electronic data storage device 18 of one of the IDs 16 with a reader device 68 associated with the user interface 24. Alternatively, the customer identification 34 may be manually entered into the computer 14 with the user interface 24. Payment for the image compilation should then be verified 70. The image compilation generation routine 64 may optionally allow the customer/family to choose 72 to defer printing of the image compilation, where home delivery of the image compilation would be preferable. If this option is not available, or home delivery is not selected, the electronic images are extracted 74 from the database, matched 76 with the appropriate stock text based upon the image capturing device identification data 38 and the visitor identification data 20' associated with the electronic image 36, and the image compilation is printed 78 for delivery to the customer/family.

Figure 4A:
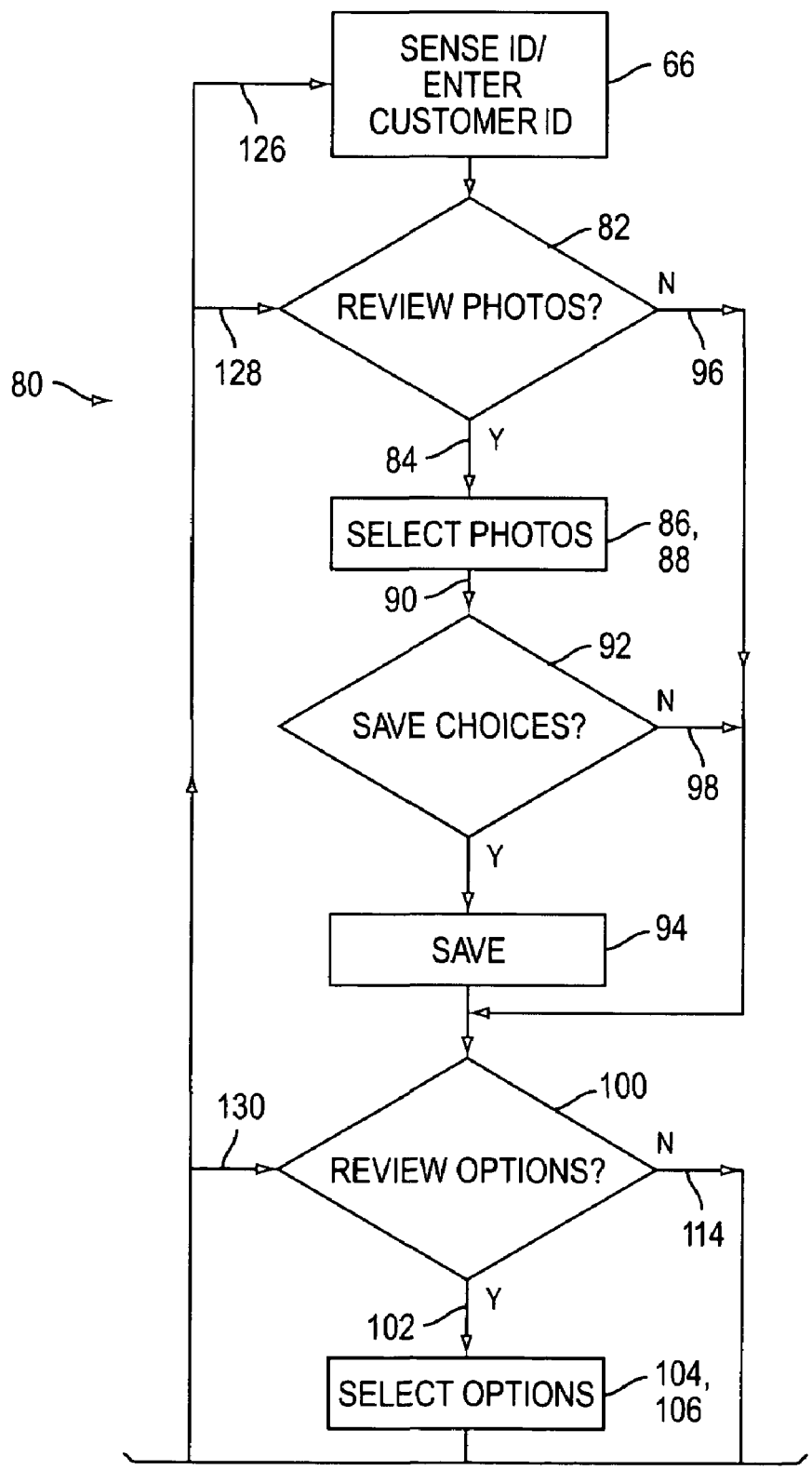
FIGS. 4a and 4b are a flow diagram of a first embodiment of a image compilation generation routine in accordance with the disclosure.
Figure 4B:
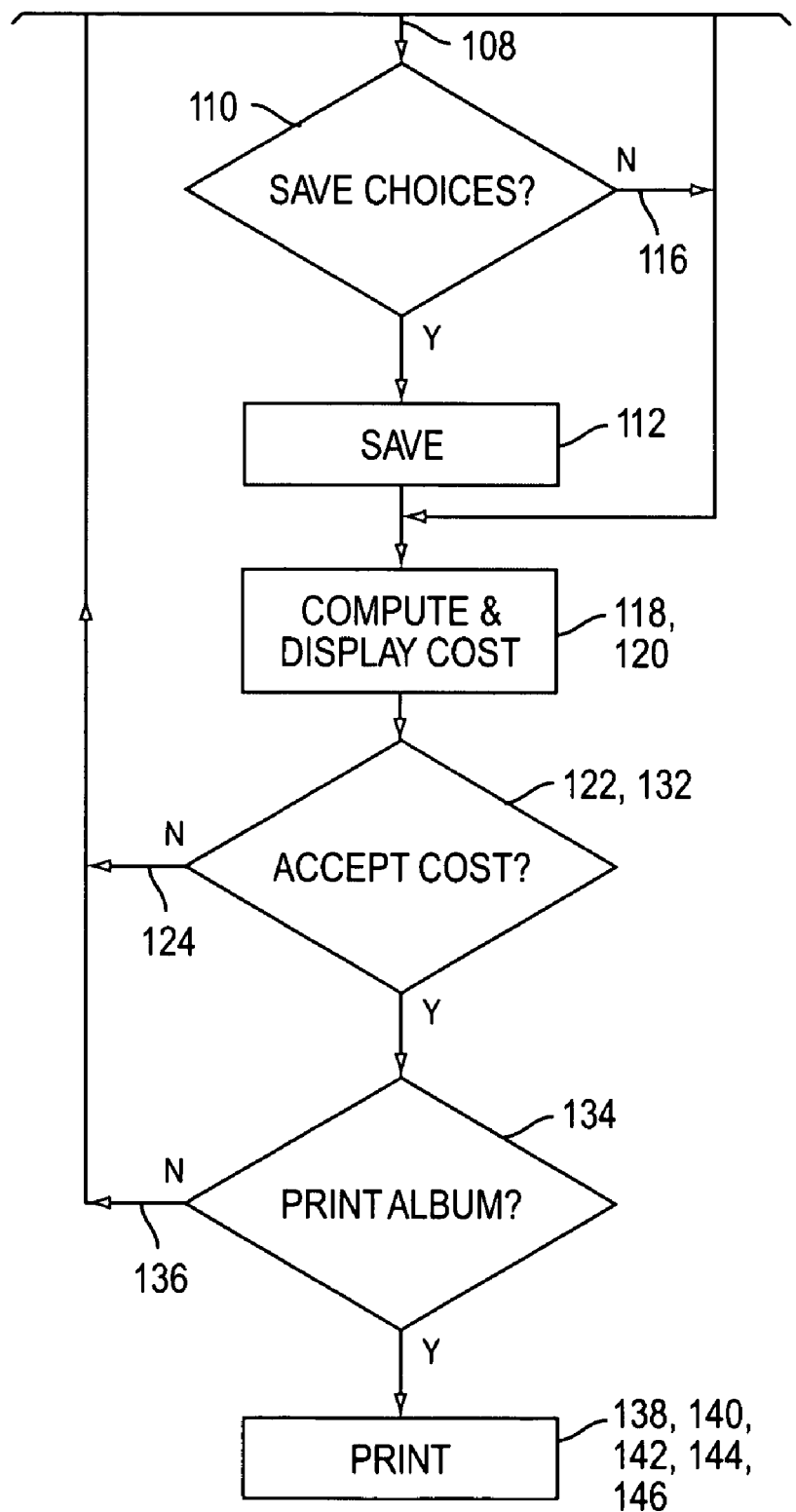

With reference to FIGS. 4a and 4b, in the case where the image compilation production system 10 installed at the setting provides for customization of the image compilations, and the customer/family has purchased a custom image compilation package, the customer record 30 for the image compilation package purchased by the customer/family is identified 66 as described above for FIG. 5. The image compilation generation routine 80 then queries 82 whether the customer/family wishes to review the electronic images that were taken during their visit. If the customer/family decides to conduct such a review 84, the electronic images are displayed 86 and the customer/family selects 88 the electronic images that will be included in the image compilation. On completing the review 90, the image compilation generation routine queries 92 the customer/family on whether the choices should be saved. After saving 94 the chosen electronic images, or if the customer/family either chooses not to review 96 the electronic images or not to save 98 the selected electronic images, the image compilation generation routine 80 queries 100 whether the customer/family wishes to review the other options allowed by the image compilation production system 10.

Such options may include selecting the text that is to be used from a set of available texts, inputting original text via the user interface, selection of the paper used to print the image compilation, binding options, and the like. If the customer/family decides to conduct such a review 102, the available options are displayed 104 and the customer/family selects 106 the options that will be included in the image compilation. On completing the review 108, the image compilation generation routine queries 110 the customer/family on whether the choices should be saved. After saving 112 the selected options, or if the customer/family either chooses not to review 114 the options or not to save 116 the selected options, the image compilation generation routine 80 computes 118 and displays 120 the cost of an image compilation having the selected electronic images and/or selected options. The image compilation generation routine 80 then queries 122 the customer/family on whether they will accept this cost. If not 124, the customer/family may 1) exit 126 the system without making any choice, with the image compilation generation routine returning to standby; 2) conduct another review 128 of the electronic images; or 3) conduct another review 130 of the options. If the customer/family pays 132 for the image compilation at the estimated cost, the image compilation generation routine 80 may optionally allow the customer/family to choose 134 to defer printing 136 of the image compilation, where home delivery of the image compilation would be preferable. If this option is not available, or home delivery is not selected, the electronic images are extracted 138 from the database and matched 140 with standard text or optionally selected text, printing/binding options 142 incorporated as necessary, and the image compilation is printed 144 for delivery to the customer/family. After the image compilation is produced, the customer record is marked as inactive 146 or removed from the database.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An image compilation production system, the image compilation production system being installed in a setting attended by a plurality of visitors, the image compilation production system comprising:

a plurality of identification devices, each identification device including an electronic data storage device having identification data stored therein, one of the identification devices being carried by at least one of the visitors to the setting;

a plurality of digital image capturing devices;

a reader device associated with each of the image capturing devices, each reader device having a detection range for sensing the identification data stored in the electronic data storage device, the reader device activating the associated digital image capturing device to capture the image of the visitor when the identification data stored in the electronic data storage device of the identification device carried by the visitor is within the detection range of the reader device; and a system computer including a memory having a database stored therein, the database including a customer record associated with each image compilation, the customer record including a customer identification, the identification data stored in the electronic data storage device of each identification device carried by each visitor associated with the image compilation, identification data for each image associated with the image compilation that is captured by one of the image capturing devices, and the identification data sensed by the reader device associated with the image capturing device;

wherein the database is queried to determine whether the customer record already includes an electronic image of the visitor that has been captured by the image capturing device associated with the reader device reading the identification data, and the digital image capturing device associated with the reader device reading the identification data is activated to capture the image of the visitor if the identification data is associated with a customer record and the database does not include an electronic image of the visitor that has been captured by the image capturing device associated with the reader device reading the identification data.

2. The image compilation production system of claim 1 wherein each of the digital image capturing devices is mounted in a fixed location.

3. The image compilation production system of claim 1 wherein at least one of the digital image capturing devices is a scene image capturing device positioned to capture the image of a predetermined view within the setting.

4. The image compilation production system of claim 3 wherein at least one of the digital image capturing devices is a portrait image capturing device positioned to capture the image of a person standing in, sitting in, or moving through a predetermined location within the setting.

5. The image compilation production system of claim 1 wherein the electronic data storage device is a radio frequency identification tag.

6. The image compilation production system of claim 1 wherein the system computer is in communication with each image capturing device and each reader device.

7. The image compilation production system of claim 6 further comprising at least one user interface in communication with the system computer.

8. The image compilation production system of claim 6 further comprising at least one production device selected from the group comprising a printing device, a binding device, or a media burner.

9. A method of producing a compilation of images captured in a setting attended by a plurality of visitors, the setting having a plurality of digital image capturing devices and an electronic data storage device reader device associated with each of the image capturing devices, the image compilation production method comprising:
  issuing an identification device to at least one visitor, the identification device including an electronic data storage device having identification data stored therein, issuing an identification device including
    creating a customer record in a database stored in a system computer, and
    storing the identification data of the identification device provided to the visitor in a field of the customer record;
  activating one of the digital image capturing devices to capture the image of the visitor including
    reading the identification data stored in all electronic data storage devices passing within sensing range of each reader device,
    determining whether the identification data is associated with any customer records in the database,
      querying the database to determine whether the customer record already includes an electronic image of the visitor that has been captured by the image capturing device associated with the reader device reading the identification data,
    activating the digital image capturing device associated with the reader device reading the identification data to capture the image of the visitor if the identification data is associated with a customer record and the database does not include an electronic image of the visitor that has been captured by the image capturing device associated with the reader device reading the identification data,
    associating identification data for the electronic image with the identification data for the visitor actuating the image capturing device, and
    storing the identification data for the electronic image and the identification data for the visitor in the associated customer record;
  saving the captured image of the visitor as a digital image; and
  compiling the digital images of the visitor.

10. The method of claim 9 wherein issuing an identification device also comprises:
  determining whether the visitor is alone or part of a larger group; and
  providing the identification device to the visitor if the visitor is alone; or
  identifying other members of the group; and
  providing one of the identification devices to each member of the group.

11. The method of claim 10 wherein issuing an identification device further comprises:
  storing the identification data of the identification device provided to the single visitor in a field of the customer record; or
  storing the identification data of each identification device provided to the members of the group of visitors in a field of the customer record.

12. The method of claim 9 wherein compiling the digital images of the visitor comprises:
  identifying the customer record for the visitor;
  verifying that payment has been received for the image compilation;
  extracting the electronic images for the visitor from the database; and
  producing the image compilation from the extracted electronic images with a production device.

13. The method of claim 12 wherein before the image compilation is produced:
  stock text is matched with at least one of the electronic images based upon the image capturing device identification data and the visitor identification data; and
  the image compilation is produced with the stock text proximate to the associated electronic image.

14. The method of claim 12 wherein before the image compilation is produced
  the visitor is queried to determine whether production of the image compilation is to be deferred; and
  the image compilation is produced at a predetermined later date if the visitor elects to defer production.

15. The method of claim 9 wherein compiling the digital images of the visitor comprises:
  identifying the customer record for the visitor
  determining whether the visitor wishes to review the digital images associated with the customer record;
  determining whether the visitor wishes to review options provided by the image compilation production system;
  computing a cost of for the image compilation;
  displaying the computed cost to the visitor;
  determining whether the visitor accepts the cost for the image compilation; and
    verifying payment has been received for the image compilation,
    extracting the selected electronic images from the database,
    implementing the selected options, and producing the image compilation with a production device; or verifying that payment has not been received for the image compilation, and waiting for visitor input.

16. The method of claim 15 wherein determining whether the visitor wishes to review the digital images associated with the customer record comprises:

querying the visitor if it wishes to review the electronic images associated with the customer record; and waiting for visitor input if the visitor chooses not to review the electronic images; or displaying the electronic images if the visitor chooses to review the electronic images; and querying the visitor if it wishes to save the selected electronic images; and saving the selected electronic images if the visitor chooses to save the selected electronic images; or waiting for visitor input if the visitor chooses not to save the selected electronic images.

17. The method of claim 15 wherein determining whether the visitor wishes to review the options provided by the image compilation system comprises:

querying the visitor if it wishes to review the options provided by the image compilation production system; and waiting for visitor input if the visitor chooses not to review the options provided by the image compilation production system; or displaying the options if the visitor chooses to review the options provided by the image compilation production system; and querying the visitor if it wishes to save the selected options; and saving the selected options if the visitor chooses to save the selected options; or waiting for visitor input if the visitor chooses not to save the selected options.

18. The method of claim 15 wherein before the image compilation is produced the visitor is queried to determine whether production of the image compilation is to be deferred; and the image compilation is produced at a predetermined later date if the visitor elects to defer production.

* * * * *